Aug. 30, 1932.  W. V. HOEFEN  1,874,042
CONVEYER CONSTRUCTION
Filed Nov. 16, 1931
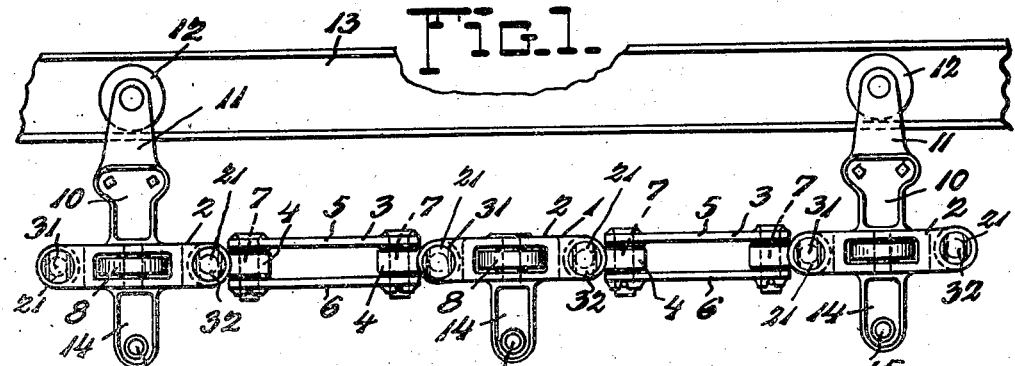
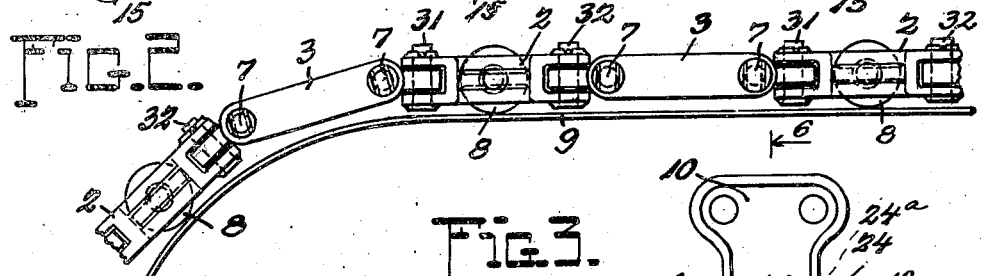
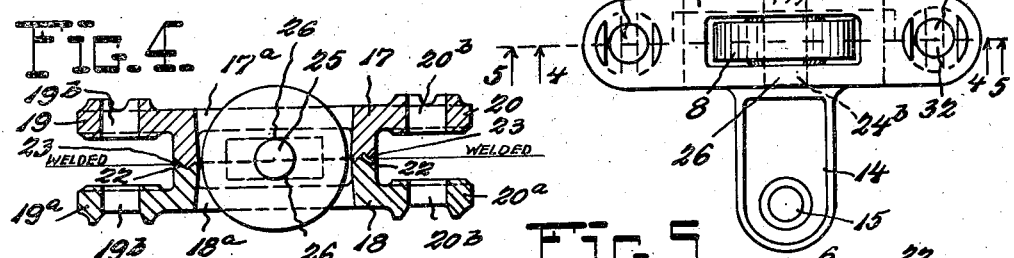
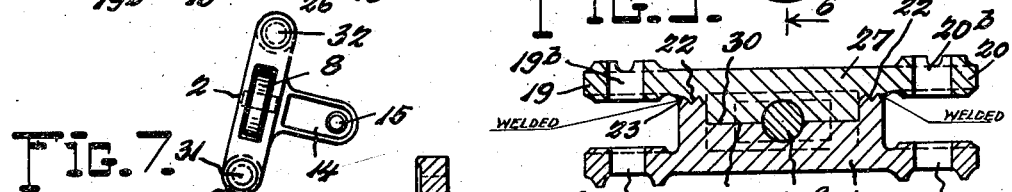
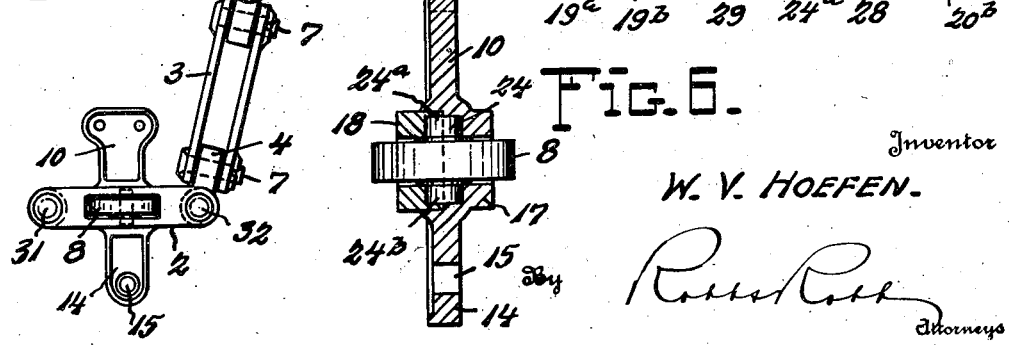
Inventor
W. V. HOEFEN.
Attorneys Patented Aug. 30, 1932

1,874,042

UNITED STATES PATENT OFFICE

WALTER V. HOEFEN, OF CLEVELAND, OHIO, ASSIGNOR TO COLONIAL IRON WORKS COMPANY, OF CLEVELAND, OHIO, A CORPORATION

CONVEYER CONSTRUCTION

Application filed November 16, 1931. Serial No. 575,415.

For many industrial operations where it is necessary to transport or convey various articles through various stages of handling, it is necessary for the conveyer to possess sufficient flexibility so as to render it capable of easily taking bends or curves in any direction of travel. To this end the conveyers are very often constructed in the form of chains, the respective links of which are pivotally connected together, and in which at least certain links are capable of horizontal and vertical movement, so as to permit the direction of travel of the conveyer chain to be changed in any manner, which may be desired, either horizontally or vertically, so that the conveyer will be readily accessible and efficiently operable irrespective of the number of changes in its travel which may be imparted to the conveyer.

The present invention relates to a conveyer chain of the type generally illustrated in the United States Patent No. 1,447,219, of Jessie E. McBride, issued March 6th, 1923.

The transverse and vertical flexibility of such conveyer chains depend largely upon the construction of the links of which such chains are composed. The flexibility of chains, especially of such as used in connection with guard rails, is rather limited and constitutes a great difficulty. Certain installations of the conveyers require the provision of a guard rail, which frequently may serve as an obstruction to the complete flexibility of the conveyer chain.

By the present invention it is proposed to eliminate the difficulties which the guard rail may impose upon operation of the chain, by the displacement of the joints for vertical and transverse motion away from the vertical line passing through the center of the trolley, which is adapted to support the chain and which runs within a rail or the like. This arrangement of the joints permits bending of the chain to an angle of about 90° in a horizontal as well as in a vertical direction. Therefore the rollers used in such chain construction to provide a frictionless engagement with the guard rail and also the links themselves may be made so as to reduce the distance from the guard rail to the links to a minimum and to allow a very narrow and light chain construction.

Further advantages are the construction of the links adapted to carry a roller, which links are designed in such a manner as to permit mounting of the roller therein in a rigid, fool-proof and very effective and compact manner.

With the foregoing discussion of the problems involved in this invention and the mode of overcoming these problems, reference is now made to the accompanying drawing, in which—

Figure 1 is a view in side elevation showing my novel conveyer chain construction.

Figure 2 is a top view of Figure 1, certain parts being omitted.

Figure 3 is a detailed view in elevation showing the construction of a chain link as used in connection with this invention.

Figure 4 is a sectional view of Figure 3, taken on line 4—4.

Figure 5 is a modification of the link construction shown in Figure 3, taken on line 5—5 of Figure 3.

Figure 6 is a sectional view of Figure 3, taken on line 6—6.

Figure 7 is a diagrammatic view of a part of the conveyor chain plainly illustrating the great vertical flexibility.

Referring now to Figure 1, 1 illustrates a conveyer composed of links 2 and 3 which are connected together by means of an intermediate member 4 adapted to permit motion of the links 2 and 3 in a horizontal and vertical direction. The link 3 comprises two side members 5 and 6 which are held together by means of a bolt 7. The said bolt 7 serves also for connecting the link 3 with the member 4 and permits a flexibility of the chain in a transverse direction. The link members 2 are of such a construction as to permit the mounting of a roller 8 which is adapted to contact with a guard rail 9, the purpose of which is to guide the conveyer chain in the direction of its travel. The link 2 is connected to the member 4 in a similar manner as the link 3 to the said member 4, so as to produce a vertical flexibility of the chain 1.

The member 2 is further provided with a suspension member 10 adapted to be connected with hangers 11 and trolleys 12. The said trolleys 12 slide upon a rail 13 which is adapted to support the weight of the chain and of any material attached to the same for the purpose of conveying. The rail 13 is bent in a vertical or horizontal direction as necessary for the transportation of goods in a corresponding direction. Extensions 14, integral with the member 2, are provided with a hole 15 and the articles to be conveyed may be hung or mounted upon said extension in any convenient manner as by means of hooks or the like. Not all of the link members 2 are provided with a suspension member, and, as clearly disclosed in Figure 1, only every fourth link member is provided with such suspension member which is adapted to carry the aforementioned trolley attachment, although this spacing may be variable.

In Figures 3, 4, and 6 there are shown detailed views of the link member 2. The said link member 2 comprises a body portion 16 comprising two halves 17 and 18 which are provided with corresponding openings 17a and 18a. The member 17 is provided with two extensions 19 and 20, while the member 18 comprises extensions 19a and 20a. The said extensions are provided with bores 19b and 20b adapted to receive bolts 21 which serve for the purpose of connecting the link members 2 by means of the members 4 with the link members 3. The contacting surfaces of the halves of the members 2 are provided with corresponding corrugations as shown at 22, so as to assure a proper alignment of the two halves 17 and 18 when the same are connected together. This may be done by welding as shown at 23, or by some other method.

Within the members 17 and 18 is mounted the roller 8 provided with a shaft 24. The members 17 and 18 are provided with bearing portions 25 and 26 which are adapted to enclose the end of the shaft 24 of the roller 8 when the two members 17 and 18 are connected together. The aforementioned corrugations 22 assure proper alignment of these two bearing portions 25 and 26 and therefore simplify assembling of this unit.

It has to be noted that each of the members 17 and 18 comprises two bearing portions 25 and 26 adapted to hold the two ends 24a and 24b of the shaft 24 properly in place and to assure the proper mounting of the roller 8 in a horizontal plane in such a manner that a comparatively frictionless mounting is produced.

Figure 5 illustrates a modification of the construction disclosed in Figure 4 and differentiates only from this figure insofar as the two members 17 and 18 are divided into two unequal portions 27 and 28. The member 28 is provided with a recess 29, while the member 27 has an extension 30 adapted to tightly fit in the recess 29 of the member 28 if the unit is assembled. This construction will permit a more rigid mounting of the roller 8 within the member 2 so that it may be especially used for a chain construction which is to be used for conveying heavy articles.

Referring now again to Figure 1, it will be noted that the pivotal connections of the member 2 as indicated at 31 and 32, which connect the said member with the members 4, are laterally disposed so as to carry these pivotal connections as far as possible away from the vertical center of the unit 2. Therefore, the dimensions of the link members in a transverse direction and also the dimensions of the rollers 8, may be reduced to a minimum, which will permit a very light construction of such chain. Furthermore, the distance between the links and the guard rail 9 may be also reduced as far as possible, and may be only as great as to permit sufficient clearance necessary for the operation of the chain, so that the width of the same in a transverse direction can be also reduced to a minimum.

The lateral disposal of the pivot points 31 and 32 away from the vertical center line of the member 2 further increases the flexibility of the conveyer in a vertical direction. This vertical flexibility is clearly illustrated in Figure 7 and it will be seen that the link member 3, which is pivoted to the link member 2 by means of the intermediate member 4, as shown at 32, will not abut against the suspension member 10 of the link 2 and therefore a free rotation of the member 3 around the pivot point 32 up to an angle of 90° can be easily accomplished. This permits changing of the direction of the conveyer chain in a vertical direction within a very small radius, which, in the constructions known today, cannot be accomplished.

The invention is not to be limited to the exact arrangement of parts shown in the accompanying drawing and described in the specification, as various changes in the details of construction may be resorted to without departing from the spirit of the invention. Only insofar as the invention has been particularly pointed out in the accompanying claims is the same to be limited. It will be accordingly understood that it is intended and desired to embrace within the scope of this invention such modifications and changes as may be necessary to adapt it to varying conditions and uses.

Having thus described my invention, what I claim as new and desire to secure by Letters Patent of the United States, is—

1. Conveyer mechanism of the class described, comprising the combination with a guard rail and a trolley rail, of a conveyer chain running along said guard rail and comprising a plurality of links, of which selected links have a body portion provided with lateral extensions thereon, a roller within the body portion adapted to roll along the guard rail, the selected links being interconnected with the remaining links by means of the said lateral extensions of the said body portion the said selected links including means for suspending the chain from the trolley rail.

2. Conveyer mechanism of the class described comprising the combination with a guard rail and a trolley rail, of a conveyer chain running along said guard rail and comprising a plurality of selected links, each having a body portion, lateral extensions on the body portion trolley members for each body portion for suspending the chain from the trolley rail, the said body portion being separable into two sub-units, bearing portions within each sub-unit, a roller within the body portion rotatably mounted in the said bearing portions adapted to roll along said guard rail, and a plurality of links interconnected with the lateral extension of the body portion.

3. Conveyer mechanism of the class described comprising the combination with a guard rail and a trolley rail, of a conveyer chain running along said guard rail comprising a plurality of selected links, each of which has a body portion, lateral extensions on the body portion suspension means for the links, a trolley secured to the suspension means and mounted on the trolley rail, the said body portion being separable into two sub-units, bearing portions within each sub-unit, each sub-unit being provided with corresponding corrugations to permit proper alignment of the bearing portions, a roller within the body portion rotatably mounted in the said bearing portions and adapted to roll along said guard rail, and a plurality of links interconnected with the lateral extension of the body portion.

4. In a conveyer mechanism of the class described comprising the combination with a guard rail, of a conveyer chain including a link member comprising a body portion, a roller within the body portion for engaging the guard rail, extensions on the said body portion provided with pivotal connecting means laterally disposed from the vertical center of body portion and roller, upwardly extending suspension means and downwardly extending load carrying means, the suspension means and the load carrying means being integral with the body portion.

5. In a conveyer mechanism of the class described comprising the combination with a guard rail, of a conveyer chain including a link formed of similarly shaped members which, when joined together, form the body of the link, and defining between them suitable spaces for rotatably carrying a roller, a roller mounted in such spaces for engaging the guard rail, means on the said body portion for pivotally connecting the link with adjacent links to form the chain, the said connecting means being disposed laterally away from the central vertical axis of the link, and instrumentalities for suspending the chain from a support along which the chain travels.

In testimony whereof I affix my signature.
WALTER V. HOEFEN.